Sept. 4, 1962  D. N. COOLEY  3,052,143
SCRAP-END FEEDER
Filed Sept. 19, 1957  2 Sheets-Sheet 1
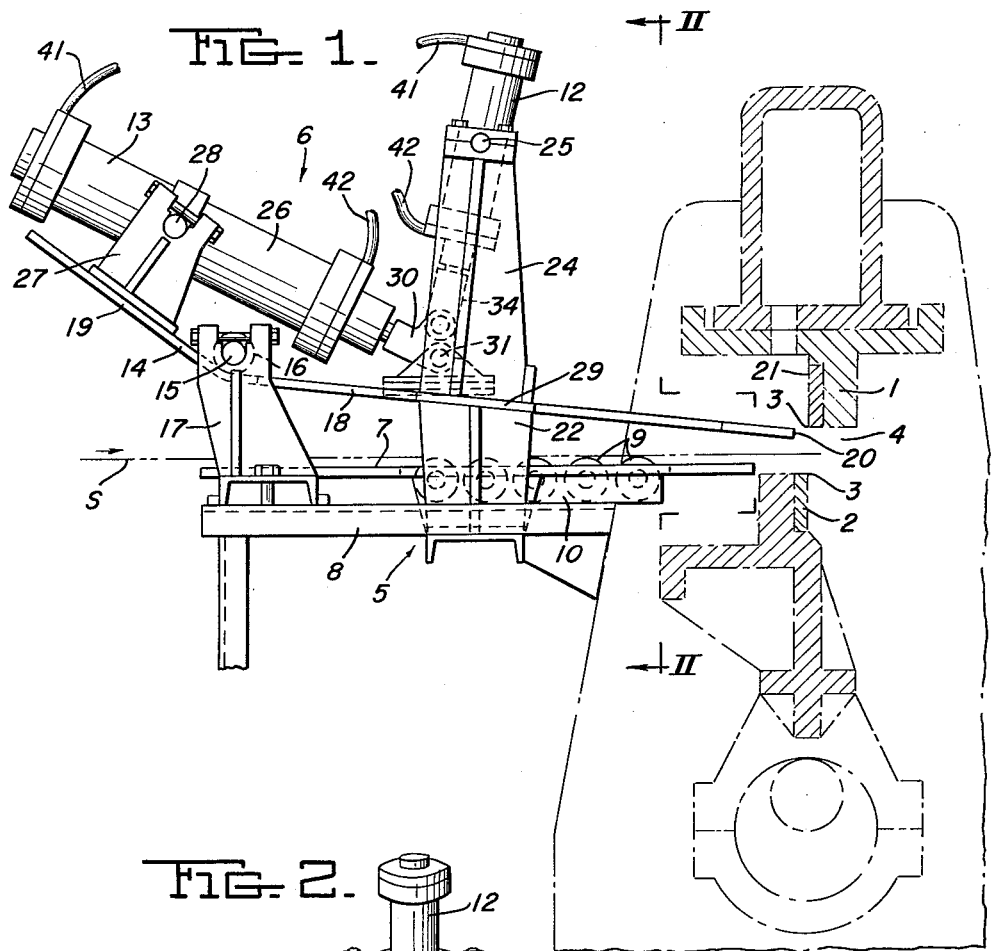
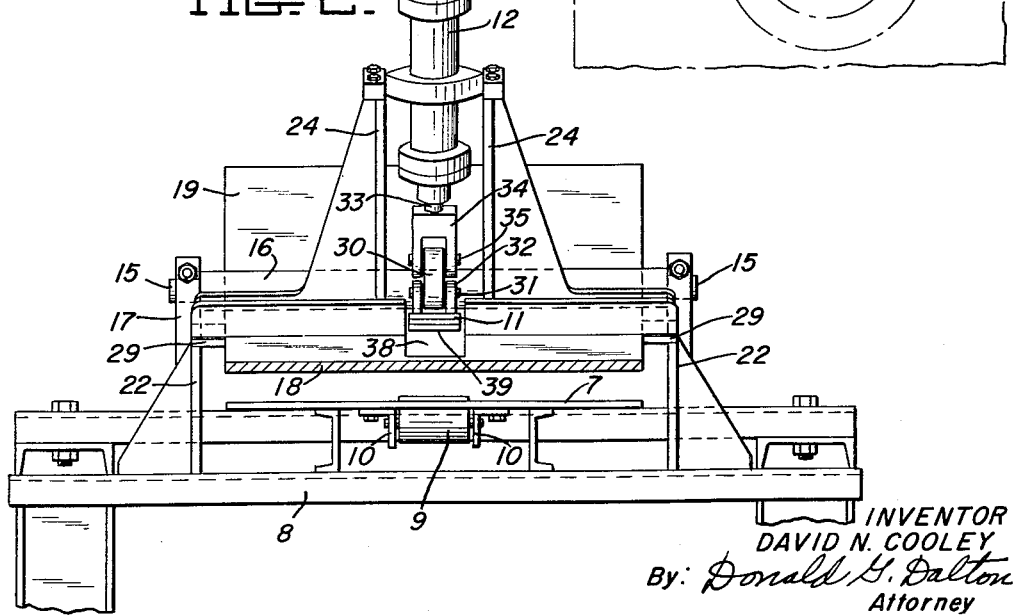
INVENTOR
DAVID N. COOLEY
By: Donald G. Dalton
Attorney

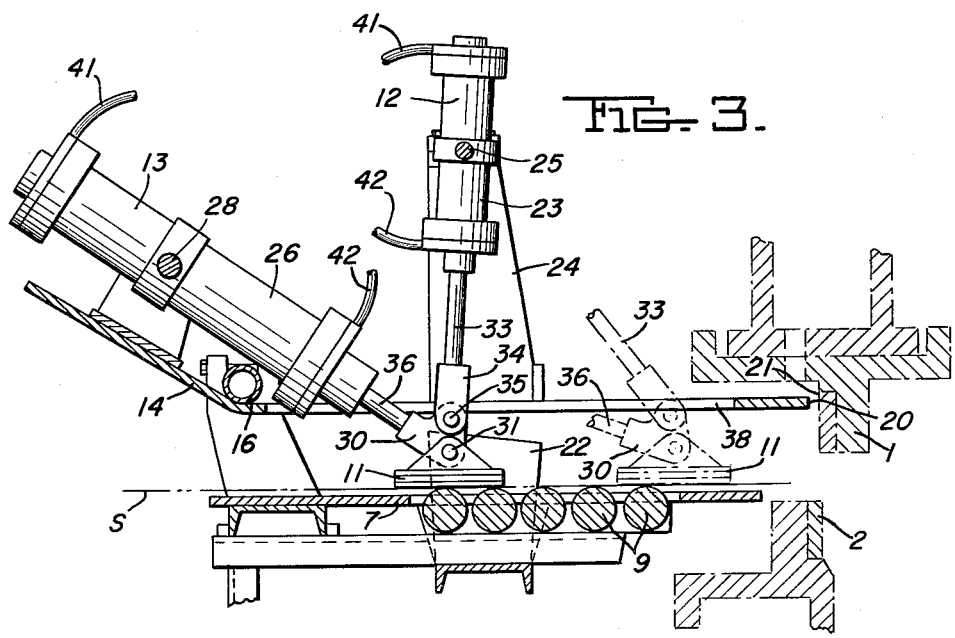
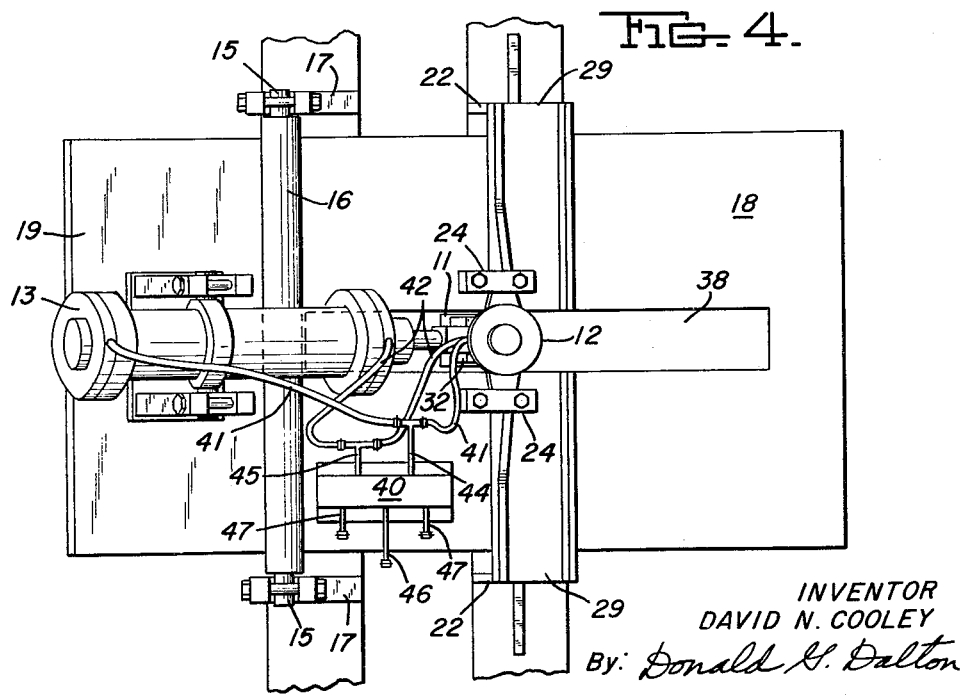

United States Patent Office 3,052,143
Patented Sept. 4, 1962

3,052,143
SCRAP-END FEEDER
David N. Cooley, Gary, Ind., assignor to United States Steel Corporation, a corporation of New Jersey
Filed Sept. 19, 1957, Ser. No. 685,008
10 Claims. (Cl. 83—112)

This invention relates to an apparatus for cutting the cropped ends of coiled strip to proper size for charging as scrap in an open hearth. More specifically it relates to an apparatus for feeding sheet material to a cutting shear. The invention also contemplates an improved mechanism for disengaging with a stripping action the sheared material with respect to one of the blades of the cutting shears.

In continuous strip processing lines, the ends of coiled strip are squared by cropping in a shear and are then welded to form a continuous strand. The cropped ends are of course suitable only as scrap but have a length such that they cannot be readily bundled or charged in an open hearth furnace. For this purpose, is is customary to run the cropped ends through the processing line shears and cut them into smaller pieces having a length of about eighteen inches each. This is usually done manually by workmen who use tongs to manipulate the cropped ends through the shears, and involves an inefficient and hazardous operation.

One of the principal objects of this invention is to provide an apparatus for feeding short lengths of metal strip to cutting shears and which eliminates a manual feeding operation of the character mentioned above. Such apparatus, generally stated, is comprised of a shoe which is lowered into frictional engagement with strip supported on a table over which the strip normally travels to cutting shears, and which is then moved along the supporting table to feed the strip to the cutting shears. In a manner to be described, the lowering and feeding movements of the strip engaging shoe are effected by fluid pressure motors which form part of a linkage system for operating the shoe.

A further and related object of the invention is to provide a mechanism for stripping the sheared strip with respect to the fixed upper blade of up-cut shears. This is accomplished, in a manner to be described, by a pivotally supported stripper plate which further cooperates with the strip feed table to provide a guide pass through which the strip is delivered to the cutting shears. Its pivotal support provides for movement of its forward end upwardly with respect to the fixed upper blade of the shears in response to a strip cutting operation thereof, and in such manner that subsequent downward pivotal movement of such forward end is effective to move the sheared strip downwardly with a stripping action relative to the upper blade and to a position in which it can be fed forwardly for another shearing operation.

Other objects and advantages of the invention will become apparent from the following description.

In the drawings there is shown a preferred embodiment of the invention. In this showing:

FIGURE 1 is a side elevational view of the apparatus of this invention, which further shows somewhat diagrammatically and in vertical section its preferred arrangement relative to a set of up-cut shears;

FIGURE 2 is an end elevational view taken substantially along the line II—II of FIGURE 1 and which omits the up-cut shears shown in FIGURE 1;

FIGURE 3 is a fragmentary and diagrammatic sectional view illustrating the manner in which the apparatus of this invention operates to feed strip to up-cut shears; and FIGURE 4 is a fragmentary plan view showing somewhat diagrammatically the piping connections and valve of the fluid pressure control system for the motors shown in the preceding figures.

The sheet feeding and stripping apparatus of this invention is particularly adapted for use with conventionally constructed up-cut shears of the type having a fixed upper blade 1 and a cam-operated vertically movable lower blade 2 of the type shown in FIGURE 1 of the drawings. The shears are shown in open position with the blades 1 and 2 spaced vertically relative to each other and their cutting edges 3 defining a space 4 through which strip S is fed by a conveyor (not shown), which is arranged between a feed table 5 and the uncoiler and leveler rolls customarily provided at the entry end of a strip processing line. A feed apparatus, designated as a whole by the numeral 6, is provided for feeding short lengths of strip from the table 5 to the cutting shears. The apparatus 6 is particularly adapted, as indicated above, for feeding ends cropped from coils of strip as an incident to an end squaring operation of the type required to enable welding the ends of two coils into a single strand.

The feed table 5 comprises a plate or platform 7 mounted on a framework 8 and parallel rollers 9, which have supporting engagement with strip S being delivered to the cutting shears. The rollers 9, as best shown in FIGURE 2, have a relatively short length compared to the width of the plate 7 and are rotatably supported in angle brackets 10 fastened to the underside of the plate 7. The brackets 10 extend along opposite sides of an opening arranged centrally in the plate 7 and through which the upper edges of the rolls 9 project and have rolling engagement with the strip S.

The mechanism 6, which feeds strip from the table 5 to the cutting shears, comprises a shoe 11, which is lowered into frictional driving engagement with strip on the table 5 and is operated to slide the strip forwardly over the table 5 to the cutting shears, and operating mechanism including fluid pressure motors 12 and 13 for effecting a strip feeeding operation of the shoe 11. Such operating mechanism is supported on a plate 14 which is arranged above the table plate 7 and rollers 9 and is supported by trunnions 15, as best shown in FIGURE 2, for pivotal movement about an axis extending transversely of the table 5. The trunnions 15 have their inner ends secured in the ends of a pipe 16, which extend transversely of and is welded to the plate 14, and their outer ends journaled in the upper ends of bearing standards 17 extending upwardly from the table supporting framework 8. Opposite end portions 18 and 19 of the plate 14 are angularly inclined relative to each other and extend forwardly and rearwardly respectively from the trunnions 15. The end 20 of the forwardly extending portion 18 is positioned adjacent the shear upper blade 1 in such manner that it moves substantially vertically relative to the face 21 of the blade 1 upon pivotal movement of the plate 14. In a manner to be described, stops 22 at opposite sides of the table 5 limit pivotal movement of the plate 14 in a clockwise direction beyond the position shown in FIGURE 1. In this position, its end 20 is positioned below the cutting edge 3 of the fixed upper blade 1 but is above the line of strip travel to the shear pass 4, and the undersurface of the plate portion 18 converges angularly downwardly relative to and cooperates with the strip supporting surface of the table 5 to define a delivery pass through which the strip has its movement guided to the shear pass 4.

As indicated above, the fluid pressure motors 12 and 13 control the strip feeding operation of the shoe 11. More particularly, the fluid pressure motor 12 controls the vertical movement of the shoe 11 into and out of frictional driving engagement with strip supported on the table 5, and the motor 13 controls the horizontal movement of the shoe 11 which is required to feed a given length of strip along the table 5 to the cutting shears. Each of these motors is a double acting expansible chamber motor that is preferably air operated. The motor 12 has a vertically extending cylinder 23 which is supported by brackets 24 on the plate portion 18 for pivotal movement about trunnions 25 projecting from opposite sides thereof in a direction transversely of the table 5. The motor 13 similarly comprises a horizontally arranged cylinder 26 which is supported on the plate portion 19 by brackets 27 for pivotal movement about trunnions 28 projecting from opposite sides thereof in a direct parallel to the trunnions 25. The cylinder 26 as shown in the drawings has a diameter larger than the cylinder 23 for a purpose to be described.

As best shown in FIGURE 2, the supporting brackets 24 for the motor 12 have end parts 29 which project laterally in opposite directions and extend over the sides of the plate 14 to which they are secured. The bracket parts 29 engage with the upper ends of the frame stops 22 and serve to limit pivotal movement of the plate 14 as explained above.

The operating connections of the motors 12 and 13 with the shoe 11 are effected through a coupling member 30 which is pivotally connected to the shoe 11 by a pin 31 and clevis 32. A piston rod 33 projecting downwardly from the motor 12 is connected with the coupling member 30 by a clevis 34 and coupling pin 35, and the piston rod 36 of the horizontally extending motor 13 has a rigid connection with the coupling member 30.

The motors 12 and 13, the mounting plate 14, the pivotal supports for these parts, and their pivotal connections with the shoe 11 in effect form an extensible toggle linkage or system for operating the shoe 11 in directions which extend both horizontally and vertically relative to the table 5. To permit these operating movements of the shoe 11, the forwardly extending plate portion 18 is provided with a centrally arranged and longitudinally extending opening 38 of rectangular shape (see FIGURE 4) which overlies the table rollers 9 and the portion of the table 5 traversed by the shoe 11 during its horizontal strip feeding movement. The opening 38 of course has a width sufficient to permit movement of the shoe 11 vertically upwardly to its retracted position above the plate 14.

The shoe 11 has a covering 39 of non-metallic material, such as that used in friction brakes, on its lower surface for better frictional gripping engagement with metal strip. The rollers 9 have a length which is greater than the width of the shoe 11 and serve to hold strip being moved by the shoe 11 out of frictional engagement with the plate 14 and thus reduce the frictional drag on the strip S.

As shown in FIGURE 4 of the drawings, the motors 12 and 13 are connected in parallel in a common fluid pressure system so that their operation is controlled simultaneously by a solenoid actuated valve 40 mounted at one side of the forwardly extending plate portion 18. The fluid pressure system controlled by the valve 40 includes a conduit 41 connected to the upper end of each of the motor cylinders 23 and 26, and a conduit 42 connected to the lower ends of each of such cylinders, the conduits 41 and 42 being connected respectively with the valve 40 by branch conduits 44 and 45. The valve 40 is a 4-way valve of conventional construction such that operation of its actuating solenoid is effective to reverse the connections of the conduits 41 and 42 with an air supply line 46 and a pair of exhaust ports 47 to the atmosphere. In its normal position, the valve 40, for example, operates to connect the conduits 42 to the air supply line 46 and the conduits 41 to the atmosphere through one of the exhaust ports 47. Under this condition, the motors 12 and 13 retract their respective piston rods 33 and 36 and hold the shoe 11 in the position shown in FIGURE 1. Upon operation by its actuating solenoid, the valve 40 operates to connect the conduits 41 to the air supply line 46 and to connect the conduits 42 to the atmosphere through the other exhaust port 47. Under this condition, air is admitted to the opposite ends of the motors 12 and 13 which operate to move the piston rods 33 and 36 to their extended positions and effect a strip feeding operation of the shoe 11 in a manner to be described.

The weight of the apparatus 6 provides a gravitational bias that is normally effective to pivot the plate 14 about its trunnions 15 to a position in which the bracket end parts 29 are engaged with the stops 22. In this position, the undersurface of the plate portion 18, as indicated above, cooperates with the table 5 to define a delivery pass for guiding strip through the shear opening 4 during its movement to an end welding apparatus in a strip processing line. Upon operation of the shears to crop and square either end of a coil of strip, the lower shear blade 2 moves upwardly over the face 21 of the upper blade 1, and, in so moving, pivots the plate portion 18 in a counterclockwise direction. When the shear blade 2 returns to its retracted position, the gravitational bias on the plate 14 becomes effective again to pivot it and move its end 20 downwardly over the face 21 of the blade 1. This movement of the end 20 is of course effective to strip the free end of the sheared strip from the fixed blade surface 21 and to thereby move it downwardly to a position in which it can move freely through the opening 4. As further indicated above, the conduits 42 during such operations are connected by the valve 40 with the air supply line 46 so that the motors 12 and 13 operate to maintain the shoe 11 in the position relative to the plate 14 shown in FIGURE 1 of the drawings.

When the apparatus is to be used to cut scrap strip such as a cropped end into smaller sections of a size suitable for charging in a furnace, the scrap strip is placed on the table 5 in a position centered over the rollers 9. The solenoid control valve 40 is then operated to reverse the connections of the conduits 41 and 42 with respect to the air supply line 46 and exhaust ports 47. This causes the motors 12 and 13 to operate and move their respective piston rods 33 and 36 to their extended positions. However, and since the cylinder 23 has the smaller diameter, pressure builds up at a more rapid rate in the motor 12, which thus has a more rapid response to this operation of the valve 40, and operates to move the shoe 11 downwardly into the position shown in solid lines in FIGURE 3 in which it has frictional driving engagement with the strip S. Thereafter, the slower acting motor 13 operates to move its piston rod 36 to its extended position and the shoe 11 is thus moved horizontally over the table 5 to the position shown in broken lines in FIGURE 3. Such horizontal movement of the shoe 11 operates to feed the strip forwardly through the space 4. The length of the strip so fed is of course determined by the operating stroke of the motor 13. After the shears are operated to cut the short length of strip fed thereto, the valve 40 is actuated to return the shoe to the position shown in FIGURE 1 and to repeat the strip feeding movements thereof.

While one embodiment of my invention has been shown and described it will be apparent that other adaptations and modifications may be made without departing from the scope of the following claims.

I claim:

1. In apparatus for feeding strip to an up-cut shear having a fixed upper blade and a vertically movable lower blade, the combination comprising a horizontal table for delivering strip to said shear along a path extending between said blades, a stripper member arranged above said table with its forward end normally occupying a position adjacent said upper blade but below the lower edge thereof, pivotal supporting means for said stripper member at a position in advance of the movement of strip to said shear providing for upward movement of its said forward end over the face of said upper blade in response to movement of the strip upwardly by a cutting action of said lower blade, and means carried by said member for feeding strip supported on said table to said shear, said feeding means providing a gravitational bias on said stripper member for moving its said forward end downwardly to said normal position in response to retracting movement of said lower blade after a cutting operation thereof, to thereby move the forward end of the strip downwardly over said upper blade face with a stripping action to a position lying along said path of strip movement.

2. Strip feeding apparatus as defined in claim 1 characterized by the provision of a stop for engaging said stripper member upon return movement of its forward end to said normal position to prevent further pivotal movement thereof by said gravitational bias.

3. Strip feeding apparatus as defined in claim 1 characterized by said stripper member cooperating with said table to define a guide pass for delivery of strip to said shear.

4. Strip feeding apparatus as defined in claim 1 characterized by said feeding means comprising a shoe adapted to have frictional engagement with strip supported on said table, means for moving said shoe vertically relative to said table to and from an operative position in which it has frictional engagement with strip thereon, and means effective when said shoe is in said operative position for moving it horizontally along said table to impart a feeding movement to the strip engaged thereby.

5. Strip feeding apparatus as defined in claim 4 characterized by said stripper member comprising a plate having an opening arranged centrally thereof and extending lengthwise of said table, and said shoe being arranged in the space between said plate and table and having operating parts extending through said opening and connected with each of said moving means.

6. Strip feeding apparatus as defined in claim 1 characterized by said feeding means comprising a shoe adapted to have frictional engagement with strip supported on said table, a first fluid pressure motor including a vertically extending cylinder with a piston rod projecting downwardly therefrom and having a pivotal connection at its lower end to said shoe for moving said shoe to and from an operative position in which it has frictional engagement with strip on said table, a second fluid pressure motor including a horizontally extending cylinder with a piston rod projecting outwardly therefrom in the direction of strip movement over said table and having a pivot connection at its outer end to said shoe, said second fluid pressure motor being effective when said shoe is in said operative position for moving it horizontally along said table to impart a feeding movement to the strip engaged thereby, and trunnion supporting means mounting each of said cylinders for rocking movement respectively about parallel axes extending transversely of the path of strip movement over said table.

7. In an apparatus for cutting metal strip, the combination comprising a table for delivering strip along a horizontal path, an up-cut shear in the path of movement of the strip over said table, said shear including a fixed upper blade having a cutting edge positioned above said path and a vertically movable lower blade having a cutting edge positioned below said path in the open position of said shear, a stripper plate arranged above said table in a position converging downwardly relative thereto and with respect to the direction of strip movement and cooperating with said table to provide a pass for guiding strip between said blade cutting edges, said plate having its forward edge arranged adjacent the side of said upper blade facing said table, pivot means spaced from said shear supporting said plate for pivotal movement about an axis extending transversely of said table, said plate having a bias for downward pivotal movement about said axis, and a stop limiting said downward pivotal movement of said plate to a position in which its said forward edge is below said upper blade cutting edge and above said path of strip movement, said pivot means providing for movement of said plate forward edge upwardly over said upper blade side in response to movement of the strip upwardly by a cutting operation of said shear.

8. A strip feeding apparatus comprising a horizontal table on which strip is supported during a feeding movement thereof, a shoe adapted to have frictional engagement with strip supported on said table, means mounting said shoe for vertical movement relative to said table from a suspended position spaced above said table and out of engagement with strip supported thereon to an operative position in which it has frictional engagement therewith, said mounting means comprising a first fluid pressure motor including a vertically extending cylinder with a piston rod projecting downwardly therefrom and having a pivotal connection at its lower end with said shoe for moving said shoe from its said suspended position to its said operative position, trunnion means mounting said cylinder and thereby said shoe for pivotal movement about an axis arranged above and extending transversely of the path of strip movement over said table, and a second fluid pressure motor angularly related to said first motor and including a cylinder with a piston rod projecting outwardly therefrom in the direction of strip movement over said table and having an articulated connection at its outer end with said shoe permitting both horizontal and vertical motion of said shoe relative to said table, said second fluid pressure motor being effective when shoe is in said operative position for pivoting said first motor cylinder about said trunnion axis and to thereby move said shoe horizontally along and relative to said table to impart a feeding movement to the strip engaged thereby.

9. A strip feeding apparatus as defined in claim 8 characterized by trunnion means mounting said second motor cylinder for pivotal movement about an axis parallel to the trunnion axis of said first motor and arranged above and extending transversely of the path of strip movement over said table.

10. A strip feeding apparatus as defined in claim 8 characterized by the provision of a common valve controlling the operation of each of said motors, and by said horizontal cylinder having a larger diameter than said vertical cylinder whereby said first motor responds more rapidly than said second motor to actuation of said valve.

References Cited in the file of this patent

UNITED STATES PATENTS

| | | |
|---|---|---|
| 484,832 | Van Wagenen | Oct. 25, 1892 |
| 791,940 | Von Philip | June 6, 1905 |
| 1,207,477 | Bignell | Dec. 5, 1916 |
| 2,110,777 | Streine | Mar. 8, 1938 |
| 2,381,571 | Buchan | Aug. 7, 1945 |
| 2,467,740 | Haller | Apr. 19, 1949 |
| 2,569,264 | Stone | Sept. 25, 1951 |
| 2,660,216 | Clayton | Nov. 24, 1953 |

FOREIGN PATENTS

| | | |
|---|---|---|
| 584,641 | Great Britain | Jan. 20, 1947 |